(12) United States Patent
Quinlan et al.

(10) Patent No.: US 12,525,791 B2
(45) Date of Patent: Jan. 13, 2026

(54) PASSIVELY ACTIVATED SWITCH SYSTEM FOR A HIGH-CURRENT COIL

(71) Applicant: Diversified Technologies, Inc., Bedford, MA (US)

(72) Inventors: Kathleen Elaine Quinlan, Somerville, MA (US); Marcel Pierre Joseph Gaudreau, Lexington, MA (US); David B. Cope, Medfield, MA (US); Megan McCandless, Cambridge, MA (US); Arieanna Blanchette, Haverhill, MA (US); Slade Lewis, Gardner, MA (US)

(73) Assignee: Diversified Technologies, Inc., Bedford, MA (US)

( * ) Notice: Subject to any disclaimer, the term of this patent is extended or adjusted under 35 U.S.C. 154(b) by 143 days.

(21) Appl. No.: 18/315,600

(22) Filed: May 11, 2023

(65) Prior Publication Data

US 2023/0369846 A1 Nov. 16, 2023

Related U.S. Application Data

(60) Provisional application No. 63/342,207, filed on May 16, 2022.

(51) Int. Cl.
*H02H 9/02* (2006.01)
*H01F 6/06* (2006.01)

(52) U.S. Cl.
CPC .............. *H02H 9/023* (2013.01); *H01F 6/06* (2013.01)

(58) Field of Classification Search
CPC ............ H02H 9/02; H02H 9/023; H02H 9/04; H02H 9/046; H02H 7/06; H01F 6/06;

(Continued)

(56) References Cited

U.S. PATENT DOCUMENTS

| 5,210,674 A | 5/1993 | Yamaguchi et al. |
| 5,414,586 A * | 5/1995 | Hara .................. H02H 9/023 361/57 |

(Continued)

FOREIGN PATENT DOCUMENTS

| JP | H06168820 A | 6/1994 |
| WO | 2021252765 A1 | 12/2021 |

OTHER PUBLICATIONS

Written Opinion of the International Searching Authority for International Application No. PCT/US23/21878 dated Sep. 21, 2023, seven (7) pages.

(Continued)

*Primary Examiner* — Danny Nguyen
(74) *Attorney, Agent, or Firm* — Iandiorio Teska & IColeman, LLP

(57) ABSTRACT

A passively activated switch system for a high-current coil including a plurality of silicon-controlled rectifiers (SCRs) each electrically coupled to a high-current coil, each SCR electrically coupled in parallel to a fast-acting mechanical switch. A passive voltage detector is responsive to an increase in voltage above a predetermined threshold value indicating a start of an over-current event which closes each of the plurality of SCRs to enable a loop current to create a large electromagnetic force. Each fast-acting switch is responsive to the large electromagnetic force and is configured to close to shunt current from each SCR to prevent damage of at least one of the high-current coils or a system that utilizes a high-current coil, or both.

30 Claims, 12 Drawing Sheets

(58) Field of Classification Search
CPC .. H01H 9/542; H01H 2009/546; H01H 9/546; H01H 9/541
USPC ........................................................ 361/219
See application file for complete search history.

(56) References Cited

U.S. PATENT DOCUMENTS

| | | | |
|---|---|---|---|
| 2003/0086234 A1* | 5/2003 | Harford | H02H 9/005 361/113 |
| 2006/0267503 A1 | 11/2006 | Bystriskii | |
| 2010/0091417 A1* | 4/2010 | Letas | F03D 9/257 361/56 |
| 2010/0211230 A1* | 8/2010 | Bulliard | H01J 37/32045 700/298 |
| 2016/0276821 A1* | 9/2016 | Politis | H02H 3/00 |

OTHER PUBLICATIONS

Chunmeng Xu et al., A Survey on Mechanical Switches for Hybrid Circuit Breakers, Conference Paper, 2019 IEEE, dated 2019, 10.1109/PESGM40551.2019.8973674, five (5) pages, United States.

* cited by examiner

PASSIVELY ACTIVATED SWITCH SYSTEM FOR A HIGH-CURRENT COIL

RELATED APPLICATIONS

This application claims benefit of and priority to U.S. Provisional Application Ser. No. 63/342,207 filed May 16, 2022, under 35 U.S.C. §§ 119, 120, 363, 365, and 37 C.F.R. § 1.55 and § 1.78, which is incorporated herein by this reference.

FIELD OF THE INVENTION

This invention relates to a passively activated switch system for a high-current coil.

BACKGROUND OF THE INVENTION

Fusion-produced electric power has many benefits including, inter alia, sustainability, fossil-fuel replacement, emission-free and carbon-free power, and availability. Additionally, fusion-produced power is not variable like solar power or wind power. Reliable electric power is crucial to economic growth in virtually all countries of the world and may be considered necessary for a high quality of life.

One of the major technical hurdles associated with devices that confine plasma, e.g., tokamaks or similar type devices that confine plasma, utilized for fusion systems that produce electric power, is that plasma disruption events may result in the generation of high-current beams, e.g., MA, of relativistic electrons, e.g., 10 s of MeV, which may cause severe damage to plasma-facing surfaces of the structure of a device that confines plasma. These high-current beams are often referred to as Runaway Electrons (RE). The severe damage caused by RE may include, inter alia, melt damage, coolant leaks, loss of vacuum, and if it occurs even once in every 1000 shots, could prevent fusion devices that confine plasma, such as the International Tokamak Experimental Reactor (ITER), the Small Prototype Advanced Robust Compact Reactor (SPARC), and similar type device from reaching their goals. See e.g., Tinguely et al., *Modeling the Complete Prevention of Disruption Generated Runaway Electron Beam Formation With a Passive 3D Coil in SPARC*, Nucl. Fusion, 61 124003 (2021), incorporated by reference herein.

High field devices that confine plasma, which may be required to add fusion power to the grid, may be even more susceptible to damage from RE than current conventional devices.

Multiple types of high-current coils may require passively-activated high-current switches to rapidly discharge current to protect either the coil itself, the system which utilizes the coil, or both. These types of high-current coils may include superconducting coils, cryogenic coils, or similar high-current coils used in various scientific or industrial applications.

SUMMARY OF THE INVENTION

In one aspect, a passively activated switch system for a high-current coil is featured. The system includes a plurality of silicon-controlled rectifiers (SCRs) each electrically coupled to a high-current coil, each SCR electrically coupled in parallel to a fast-acting mechanical switch. A passive voltage detector is responsive to an increase in voltage above a predetermined threshold value indicating a start of an overcurrent event which closes each of the plurality of SCRs to enable a loop current to create a large electromagnetic force. Each fast-acting switch is responsive to the large electromagnetic force and configured to close to shunt current from each SCR to prevent damage of a high-current coil or a system that utilizes a high-current coil.

In one embodiment, the high-current coil may be classified as at least one of: a non-axisymmetric runaway electron mitigation coil (REMC), a superconducting coil, a cryogenic coil, or a coil used for industrial or scientific purposes. Over-current events, including the start of a plasma disruption event, are disrupted by the passively-activated switch system, and energy is removed from the system. Each fast-acting switch may be electromagnetically-actuated. Each fast-acting switch may be configured to protect each SCR from overheating at high action integrals. The system may include an outer conductor coupled to the high-current coil, a center conductor coupled to the high-current coil, an upper base plate, and a lower base plate. The system may include a conductive semi-flexible strap coupled to the lower base plate, a beam-bending conductor coupled to the semi-flexible strap, a fast-acting mechanical switch contact return, a current-sharing dissipative resistor, and a disconnect switch, each coupled to one of the plurality of SCRs. The electromagnetic force between the center conductor and the beam-bending conductor may cause the beam-bending conductor to contact the fast mechanical switch contact return to enable the fast-acting mechanical switch to shunt current from the SCR. Each current-sharing dissipative resistor may be configured to equalize the loop current to ensure the electromagnetic force is about equal in each fast-acting mechanical switch such that each fast-acting mechanical switch closes at about the same time. Each current-sharing dissipative resistor may be configured to equalize the loop current to ensure the electromagnetic force is about equal in each fast-acting mechanical switch and each SCR to prevent damage to one or more of the plurality of SCRs. Each SCR may be configured to provide a fast rise time to rapidly shunt the loop current to each fast-acting switch thereby enabling each fast-acting switch to provide a higher action integral than each SCR independently. A required number of SCRs which conduct a predetermined input current may be determined by dividing the predetermined input current by a maximum current capacity of each SCR. The system may be configured to accommodate different predetermined input currents and the number of SCRs required may be determined by each different predetermined input current. No external power may be required by the system. The system may include a vacuum feedthrough subsystem including at least one sliding ceramic seal configured to maintain a high vacuum in a high vacuum chamber when power is conducted through the vacuum feedthrough subsystem to prevent high shock and high forces from damaging the vacuum feedthrough subsystem.

In another aspect, a method for a passively activated switch system for a high-current coil is featured. The method includes providing a plurality of silicon-controlled rectifiers (SCRs) each electrically coupled to a high-current coil, each SCR electrically coupled in parallel to a fast-acting mechanical switch, detecting an increase in voltage above a predetermined threshold value indicating a start of an overcurrent event which closes each of the plurality of SCRs to enable a loop current to create a large electromagnetic force. Each fast-acting switch is responsive to the large electromagnetic force and is configured to close to shunt current from each SCR to prevent damage of at least one of the high-current coils or a system that utilizes a high-current coil.

In one embodiment, the method may include electromagnetically actuating each fast-acting switch. Each fast-acting switch may be configured to protect each SCR from overheating at high action integrals. The method may include providing an outer conductor coupled to the high-current coil, a center conductor coupled to the high-current coil, an upper base plate, and a lower base plate. The method may include providing a conductive semi-flexible strap coupled to the lower base plate, a beam-bending conductor coupled to the semi-flexible strap, a fast-acting mechanical switch contact return, a current-sharing dissipative resistor, and a disconnect switch, each coupled to one of the plurality of SCRs. The electromagnetic force between the center conductor and the beam-bending conductor may cause the beam-bending conductor to contact the fast mechanical switch contact return to enable the fast-acting mechanical switch to shunt current from the SCR. Each current-sharing dissipative resistor may be configured to equalize the loop current to ensure the electromagnetic force is about equal in each fast-acting mechanical switch such that each fast-acting mechanical switch closes at about the same time. Each current-sharing dissipative resistor may be configured to equalize the loop current to ensure the electromagnetic force is about equal in each fast-acting mechanical switch and each SCR to prevent damage to one or more of the plurality of SCRs. Each SCR may be configured to provide a fast rise time to rapidly shunt the loop current to each fast-acting switch thereby enabling each fast-acting switch to provide a higher action integral than each SCR independently. A required number of SCRs which conduct a predetermined input current may be determined by dividing the predetermined input current by a maximum current capacity of each SCR. The system may be configured to accommodate different predetermined input currents and the number of SCRs required is determined by each different predetermined input current. No external power may be required by the system. The method may include providing a vacuum feedthrough subsystem including at least one sliding ceramic seal configured to maintain a high vacuum in a high vacuum chamber when power is conducted through the vacuum feedthrough subsystem to prevent high shock and high forces from damaging the vacuum feedthrough subsystem.

The subject invention, however, in other embodiments, need not achieve all these objectives and the claims hereof should not be limited to structures or methods capable of achieving these objectives.

BRIEF DESCRIPTION OF THE SEVERAL VIEWS OF THE DRAWINGS

Other objects, features and advantages will occur to those skilled in the art from the following description of a preferred embodiment and the accompanying drawings, in which.

DETAILED DESCRIPTION OF THE INVENTION

Figure 1:
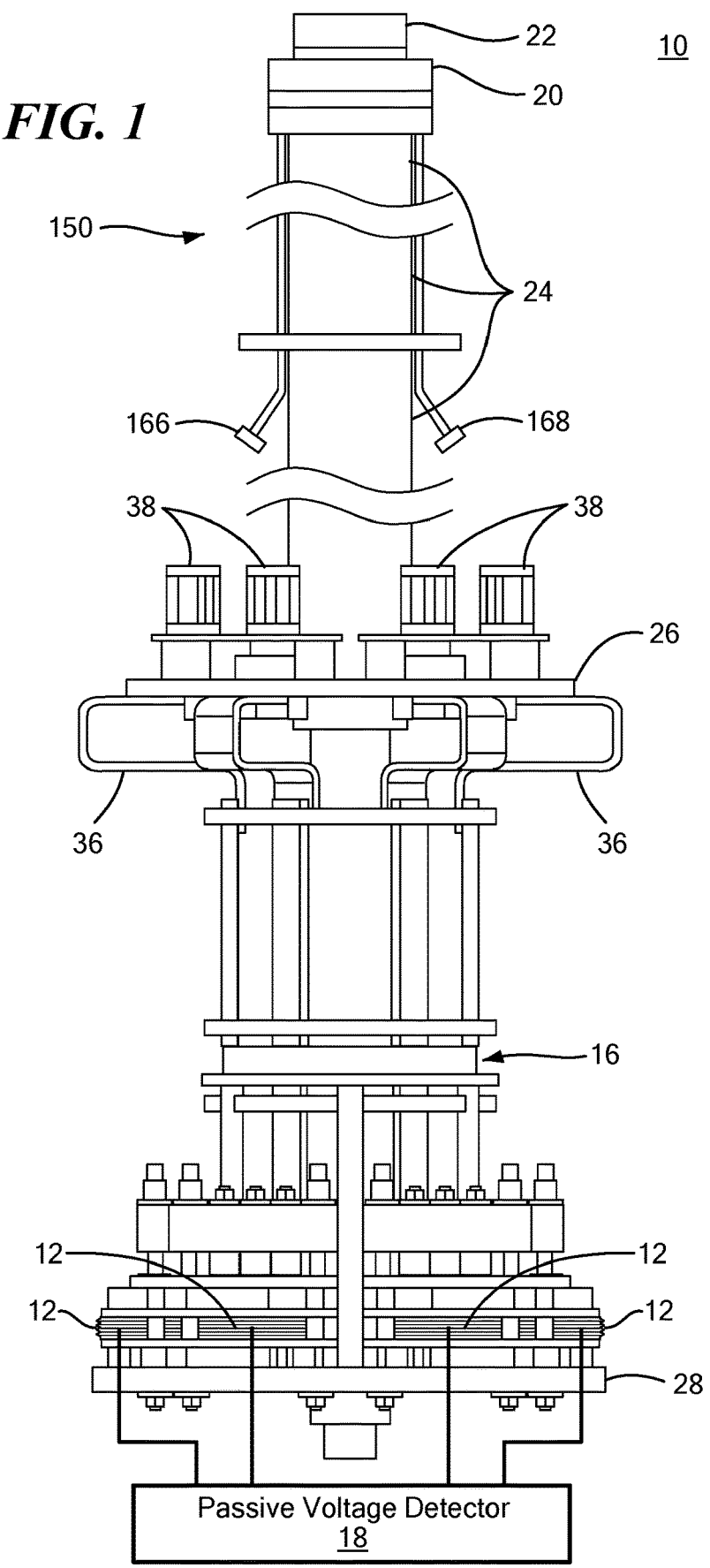
FIG. 1 is a schematic diagram showing the primary components of one example of the passively activated switch system for a high-current coil.

Aside from the preferred embodiment or embodiments disclosed below, this invention is capable of other embodiments and of being practiced or being carried out in various ways. Thus, it is to be understood that the invention is not limited in its application to the details of construction and the arrangements of components set forth in the following description or illustrated in the drawings. If only one embodiment is described herein, the claims hereof are not to be limited to that embodiment. Moreover, the claims hereof are not to be read restrictively unless there is clear and convincing evidence manifesting a certain exclusion, restriction, or disclaimer.

There is shown in FIG. 1, one example of passively activated switch system 10 for a high-current coil. Switch system 10 includes a plurality of silicon-controlled rectifiers (SCRs) 12 each electrically coupled to high-current coil 14, FIG. 2. High-current coil 14 may include a non-axisymmetric runaway electron mitigation coil (REMC), a super conducting coil, a cryogenic coil, a high-current coil used for industrial or scientific purposes, or similar type high-current coil. FIGS. 3A and 3B show examples of high-current coil 14 configured as a non-axisymmetric REMC 14. In this example, REMC 14 is typically housed inside or outside of a vacuum chamber of a device that confines plasma e.g., a Tokamak, or similar type device that confines plasma.

In the example shown in one or more of FIGS. 1-3B, switch system 10 preferably includes six (6) SCRs 12. FIG. 4 shows in further detail one example of switch system 10 including six SCRs 12 (five of which are visible). Switch system 10 may have more or less than six SCRs, as discussed in further detail below.

Figure 2:
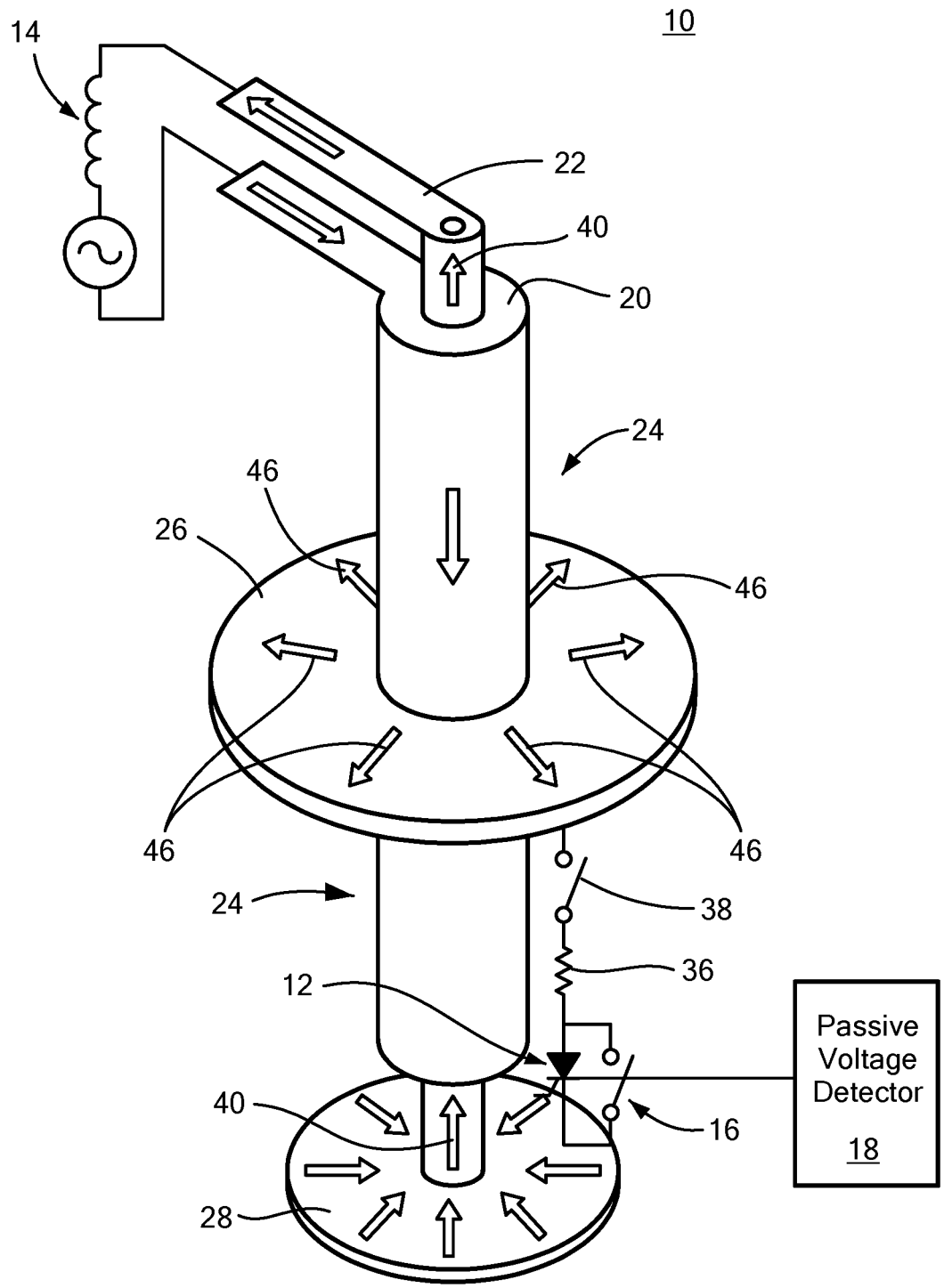
FIG. 2 is a three-dimensional view showing in further detail an example of the current path through the switch system shown in FIG. 1 and an example one of the SCRs shown in FIG. 1 electrically coupled in parallel to the fast-acting mechanical switch.
Figure 3:
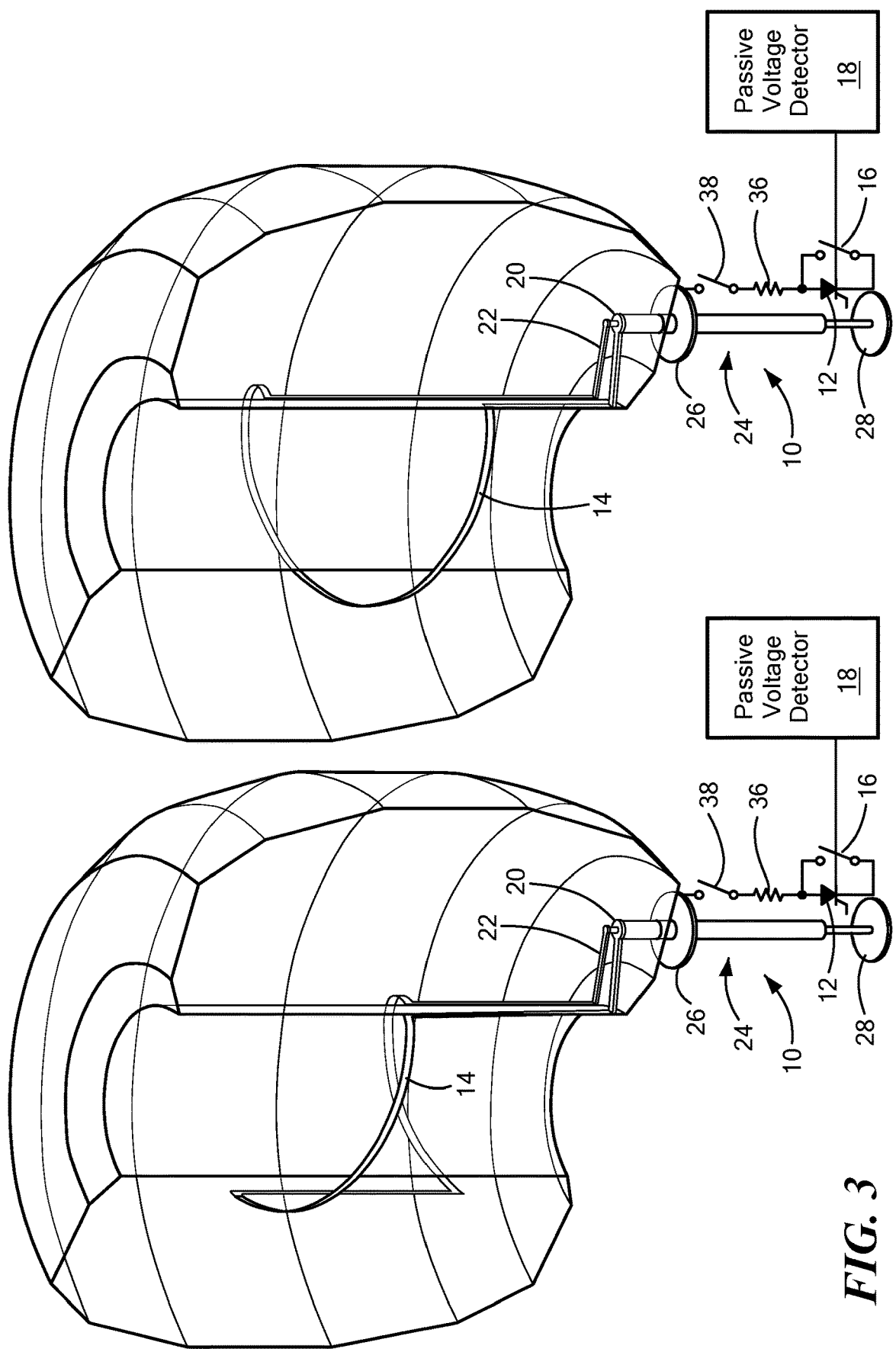
FIGS. 3A and 3B are three-dimensional views showing examples of the high-current coil shown in FIG. 2 configured as non-axisymmetric REMCs located inside a chamber of a device that confines plasma and the switch system and feedthrough shown in FIGS. 1-2 coupled to a vacuum chamber.
Figure 4:
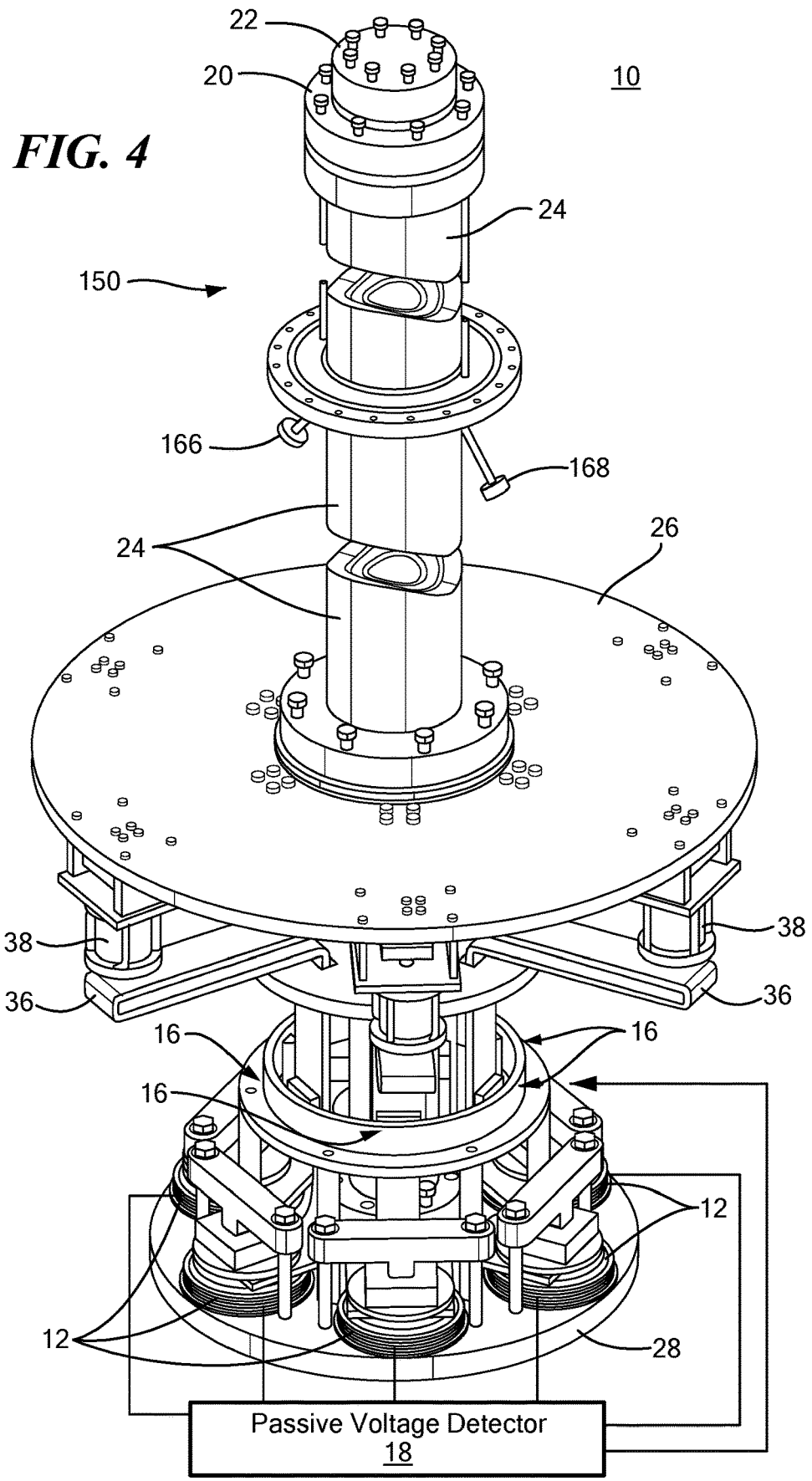
FIG. 4 is a three-dimensional view of one example of the passively activated switch system shown in one or more of FIGS. 1-4 showing in further detail six SCRs each coupled to a fast-acting mechanical switch.

Each SCR 12, FIGS. 1-4, is coupled in parallel to fast-acting mechanical switch 16. For clarification purposes only, FIG. 2 shows only one SCR 12 coupled in parallel to one fast-acting mechanical switch 16. When switch system 10 includes six SCRs 12, the current is split six ways, e.g., as shown by arrows 46, FIG. 2, to each SCR 12 coupled in parallel to fast-acting mechanical switch 16.

Switch system 10, FIGS. 1-4, includes passive voltage detector 18 coupled to each SCR 12 as shown. During an over-current event, the loop voltage on high-current coil 14, FIG. 2, will increase above a predetermined threshold value, e.g., a voltage in the range of about 15 V to 100 V, e.g., about 20 V, or similar threshold voltage. Passive voltage detector 18 is responsive to the increase in voltage indicating the start of an over-current event and closes, or passively activates without the need for any external power, each of the plurality of SCRs 12 to enable a loop current to create a large electromagnetic force, discussed in detail below.

Each fast-acting switch 16 coupled in parallel to SCR 12 is responsive to the large electromagnetic force and closes to shunt current from each SCR 12 to prevent damage of at least one of high-current coil 14, a system that utilizes high-current coil 14, or both. Such high-current coils 14 may include REMC coils, superconducting coils, cryogenic coils, pulsed high-current coils used in various scientific or industrial applications, or similar type high-current coils. In the example when high-current coil 14 is an REMC, the large electromagnetic force and closes to shunt current from each SCR 12 to prevent the build up of energy in electrons that may lead to a destructive runaway electron event.

In operation, the current is initially conducted by each SCR 12 because each SCR 12 preferably has a very fast activation or turn-on time, e.g., in μsecs, such as 1 μsec or similar turn-on time. Each fast-acting mechanical switch 16 preferably has a slower activation or closing-time active, e.g., in msec, such as 2, 3, or 4 msec, or similar closing time. The closing time of fast-acting mechanical switch 16 depends on the large electromagnetic force, and therefore the current, as well as the structure of fast-acting mechanical switch 16, discussed in detail below.

Then, each fast-acting mechanical switch 16 relieves each SCR 12 of the current for the remainder of the pulse. In one example, SCR 12 of switch system 10 may be a ABB #5STP 45Y8500 (ABB, Vasteras, Sweden) which is an extraordinarily large, 8500 V, 90 kA max class device. While each SCR 12 preferably conducts up to about 90 kA of current, the action integral ($\int i^2$ dt) of each SCR 12 limits the time that the maximum current can be conducted. For example, in 10 msec, the maximum $\int i^2$ dt is $81 \cdot 10^6$ $A^2$sec. Thus, switch system 10 includes fast-acting mechanical switch 16 coupled in parallel to each SCR 12 which is preferably capable of conducting current with a virtually unlimited action integral. Because each fast-acting mechanical switch 16 is connected electrically in parallel with each SCR 12, it shares the current, and being of lower voltage drop, it relieves each SCR 12 of the majority of its current.

Preferably, each fast-acting switch 16 is electromagnetically actuated and preferably protects each SCR 12 from overheating at high action integrals ($\int i^2$ dt).

Switch system 10, FIGS. 1-4, preferably includes outer conductor 20 coupled to high-current coil 14 and center conductor 22 coupled high-current coil as shown. Outer conductor 20 and center conductor 22 are preferably housed in coaxial feedthrough 24 as shown. Switch system 10 also preferably includes upper base plate 26 and lower base plate 28 coupled to coaxial feedthrough 24 as shown.

Figure 5A:
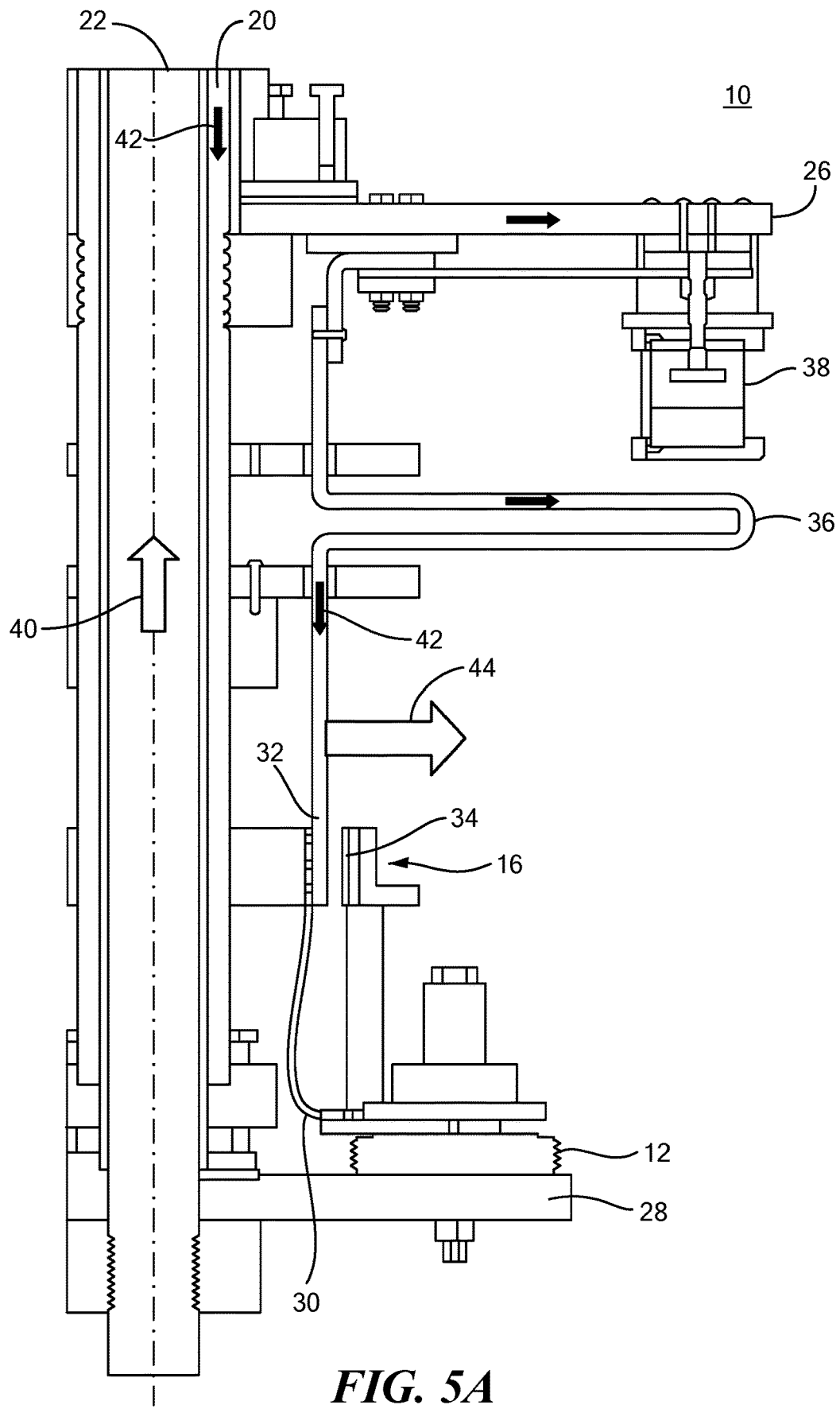
FIGS. 5A-5D are 2D are cross-sectional views showing in further detail the additional components of the switch system shown in one or more of FIGS. 1-4 and an example of the operation of the SCR and fast-acting mechanical switch.
Figure 5B:
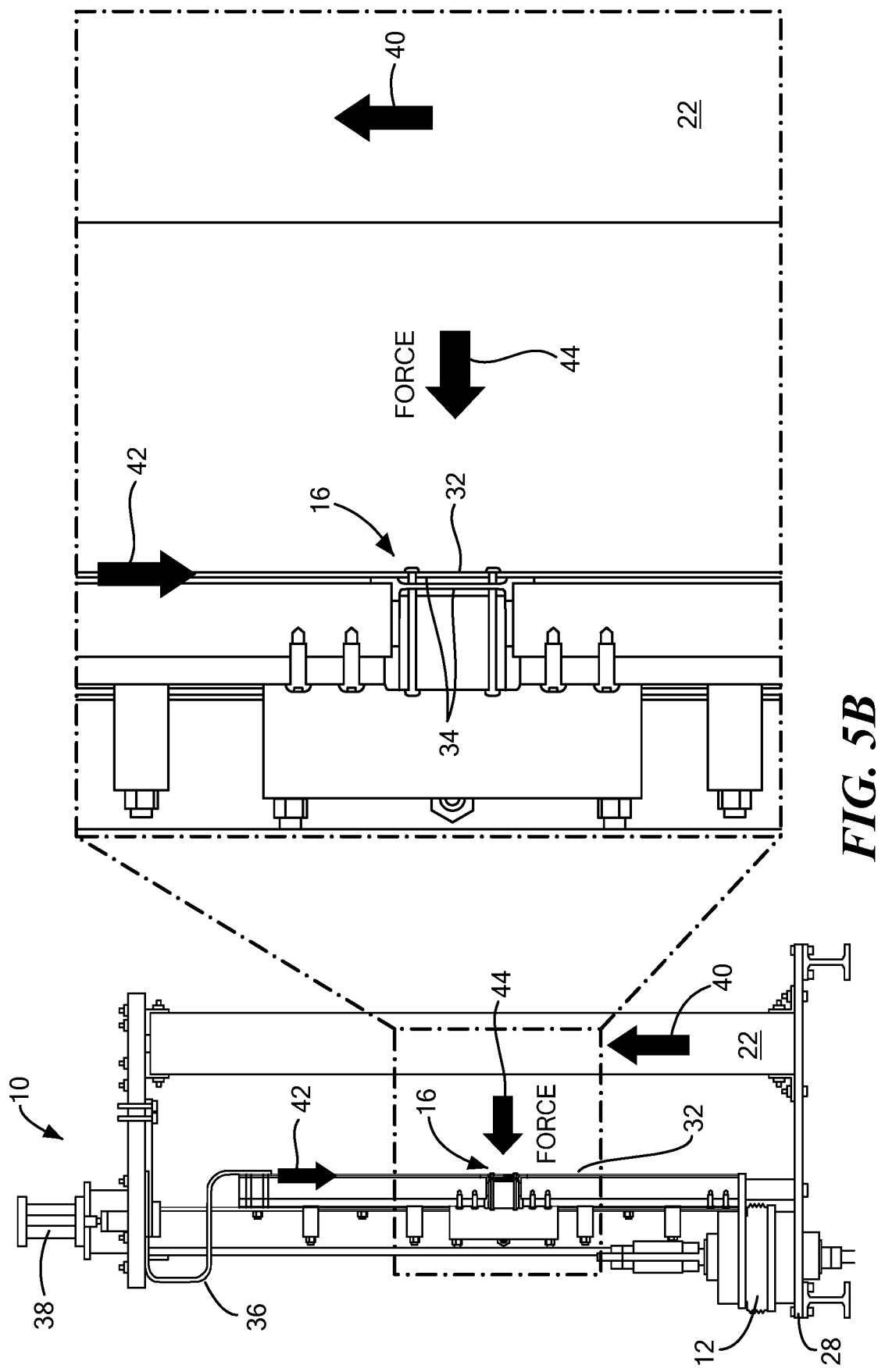

For each SCR 12 shown in FIGS. 1-4, switch system 10 preferably includes conductive semi-flexible strap 30, FIG. 5A, coupled to lower base plate 28 as shown, beam-bending conductor 32 coupled to conductive semi-flexible strap 30, fast-acting mechanical switch contact return 34, shown in greater detail in FIG. 5B, current sharing dissipative resistor 36, FIG. 5A, e.g., a strap resistor, and disconnect switch 38, coupled to each SCR 12 as shown. One or more current sharing dissipative resistors 36 and disconnect switches 38 are also shown in FIGS. 1-4.

As known by those skilled in the art, high electromagnetic forces are created by the repulsion between closely spaced parallel conductors with currents traveling in opposite directions. The repulsion force for this is provided by equation (1) below:

$$\text{Force} = \frac{\mu_0 I_1 I_2 l}{2\pi d} \quad (1)$$

where $I_1$ and $I_2$ are the parallel currents traveling in opposite directions, $E$ is the length of the moving beam conductor, and d is the spacing between the center conductor and the moving beam.

In operation, an electromagnetic force is created between the loop current in closely parallel center conductor 22, FIGS. 1, 2, 4, 5A and 5B, indicated by arrow 40, FIGS. 5A and 5B and the loop current in beam-bending conductor 32, indicated by arrow 42. In one example, the loop current in center conductor 22 and beam-bending conductor 32 is in the range of about 10 kA to about 350 kA. This large electromagnetic force, indicated by arrow 44, FIGS. 5A and 5B, is applied to beam-bending conductor 32 and causes beam-bending conductor 32 to bend slightly and contact fast-acting mechanical switch contact return 34 and enable, or close, fast-acting mechanical switch 16 to shunt current from each SCR 12, e.g., to lower base plate 28 to prevent damage of at least one of high-current coil 14, a system that utilizes high-current coil 14, or both. In the example when high-current coil 14 is a REMC, fast-acting mechanical switch 16 shunts current from each SCR 12 to prevent the buildup of energy in electrons that may lead to a destructive runaway electron event.

Figure 5C:
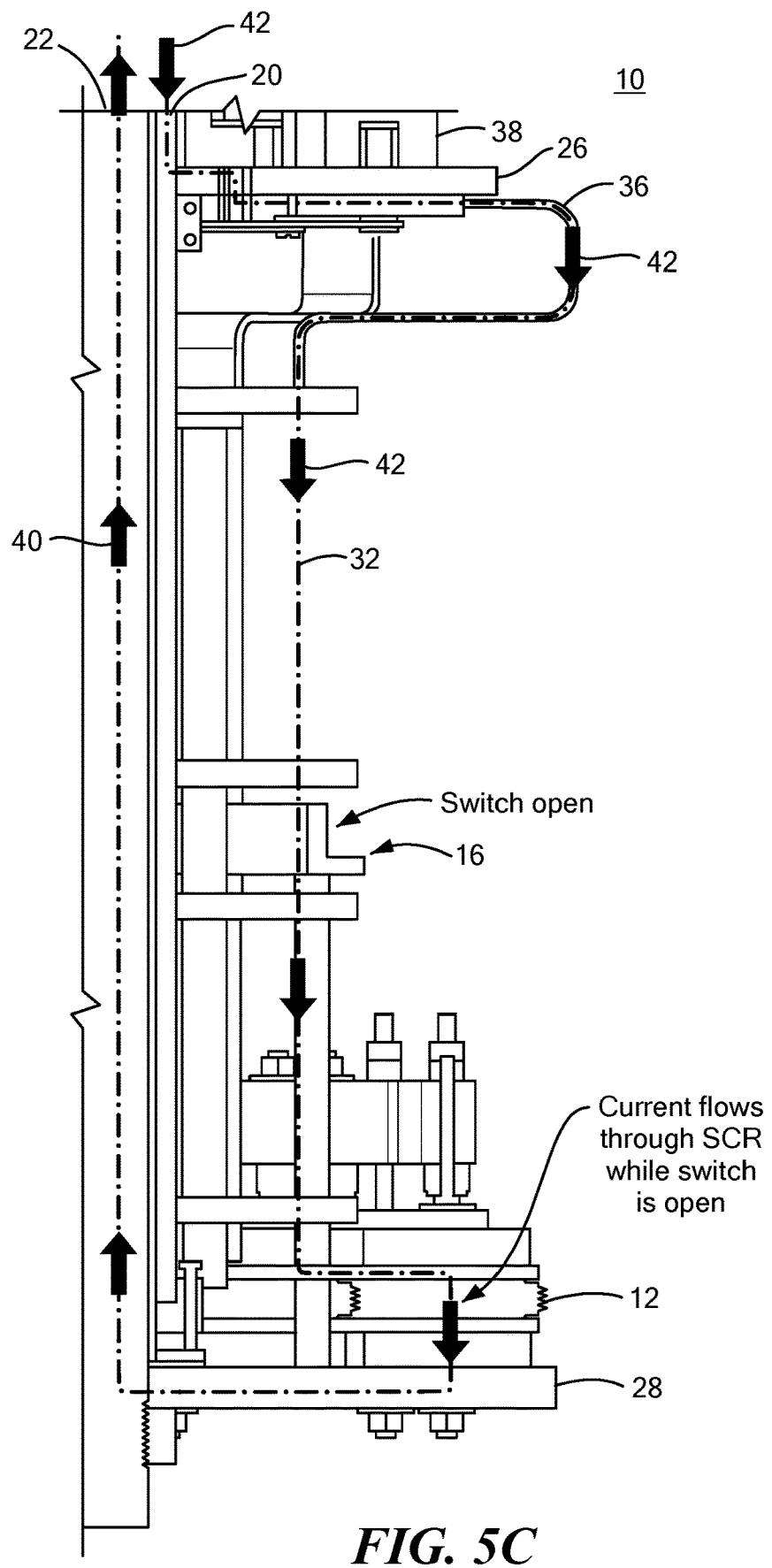

FIG. 5C, where like parts have been given like numbers, shows an example of switch system 10 when fast-acting mechanical switch 16 is open and current flows through SCR 12 as shown.

Figure 5D:
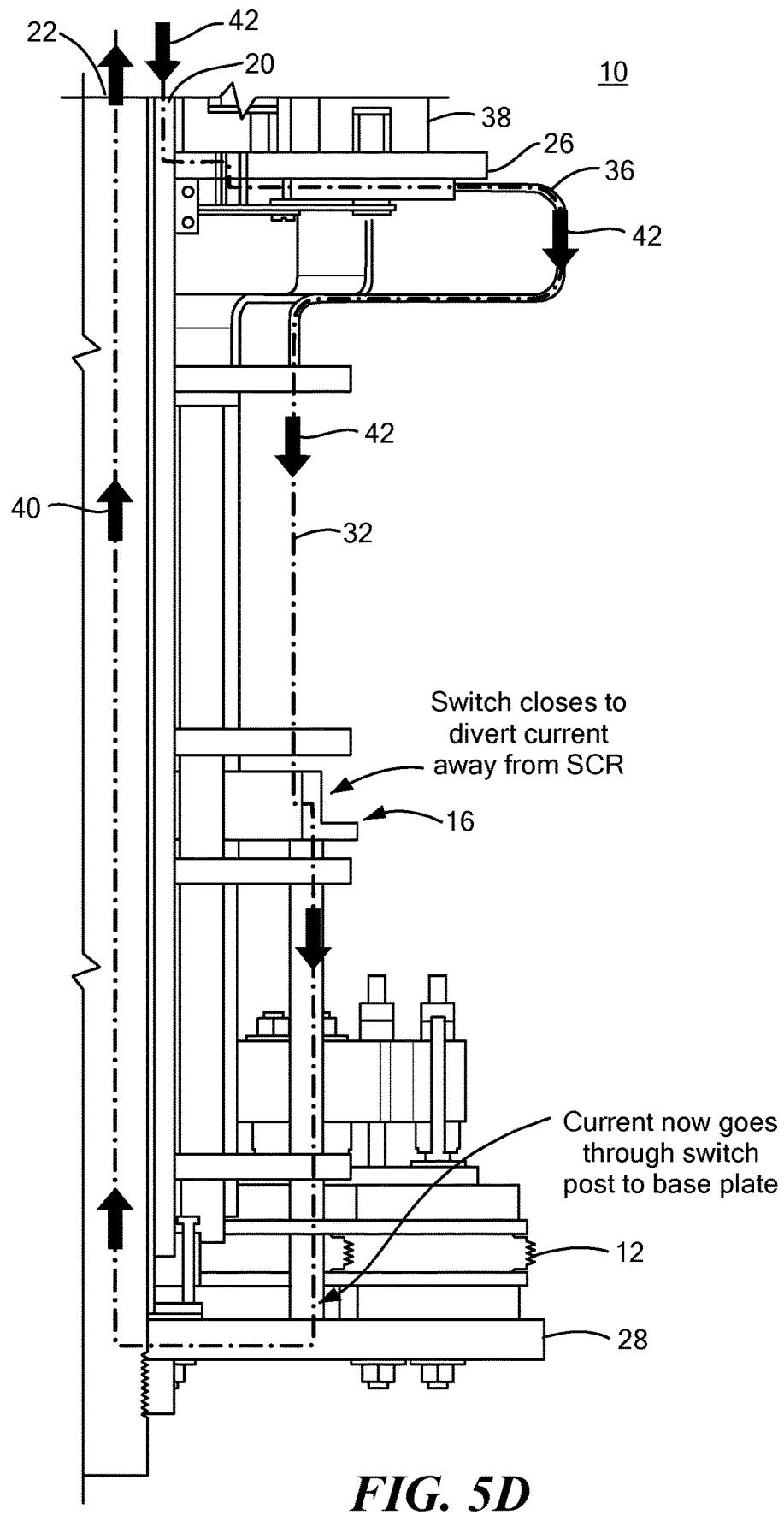

FIG. 5D, where like parts have been given like numbers, shows an example of switch system 10 when fast-acting mechanical switch 16 is closed and current flows through fast-acting mechanical switch 16 as shown to lower base plate 28 to shunt current for SCR 12 to prevent build up with energy in electrons that may lead to a destructive runaway electron event, as discussed above.

Conductive semi-flexible strap 30 allows for motion of beam-bending conductor 32. Each fast-acting mechanical switch 16 becomes passively engaged as a result of the large forces generated on the beam-bending conductor 32 by the large peak currents through the SCRs 12. Conductive semi-flexible strap 30 allows for subtle beam movement, e.g., less than about ⅛". These forces close the metal contact between beam-bending conductor 30 and fast-acting mechanical switch contact return 34. Because fast-acting mechanical switch 16 is electrically in parallel with SCR 12, it shares the current, and being of lower voltage drop, it relieves SCR 12 of the majority of its current, thereby limiting SCR internal heating.

Each current sharing dissipative resistor 36, shown in one or more of FIGS. 1-5D, preferably equalizes the loop current to ensure the electromagnetic force is about equal in each fast-acting mechanical switch 16 such that each fast-acting mechanical switch 16 closes at about the same time.

Each current sharing dissipative resistor 36 preferably equalizes the loop current to ensure the electromagnetic force is about equal in each fast-acting mechanical switch 16 and in each of the plurality of SCRs 12 to prevent damage to one or more of the plurality of SCRs 12.

Each SCR 12 preferably provides a fast rise time to rapidly shunt the loop current from each fast-acting switch 16 thereby enabling each fast-acting switch 16 to provide a higher action integral than each SCR 12 independently.

In one example, the required number of SCRs 12 which conduct a predetermined input current, e.g., an input current from about 50 kA to about 700 KA, e.g., 500 kA, and the number of SCRs 12 required by switch system 10 is preferably determined by dividing the predetermined input current by the maximum current capacity of each SCR 12.

Switch system 10 is preferably configured to accommodate different predetermined input currents and the number of SCRs 12 required by switch system 10 is preferably determined by each different predetermined input current.

Switch system 10 preferably includes current sharing dissipative resistor 36 discussed above in each of the six current paths, e.g., as shown by arrows 46, FIG. 2. Current sharing dissipative resistor 36 are preferably designed to intentionally increase in resistance at the higher temperatures during a current pulse, which will reduce the pulse duration. Current sharing dissipative resistor 36 are also preferably configured to ensure equal current sharing among the six SCR 12 paths.

Disconnect switch 38 may be configured as a fail-safe air-actuated series disconnect switch to safeguard the switch system 10 for maintenance or other purposes.

Figure 6:
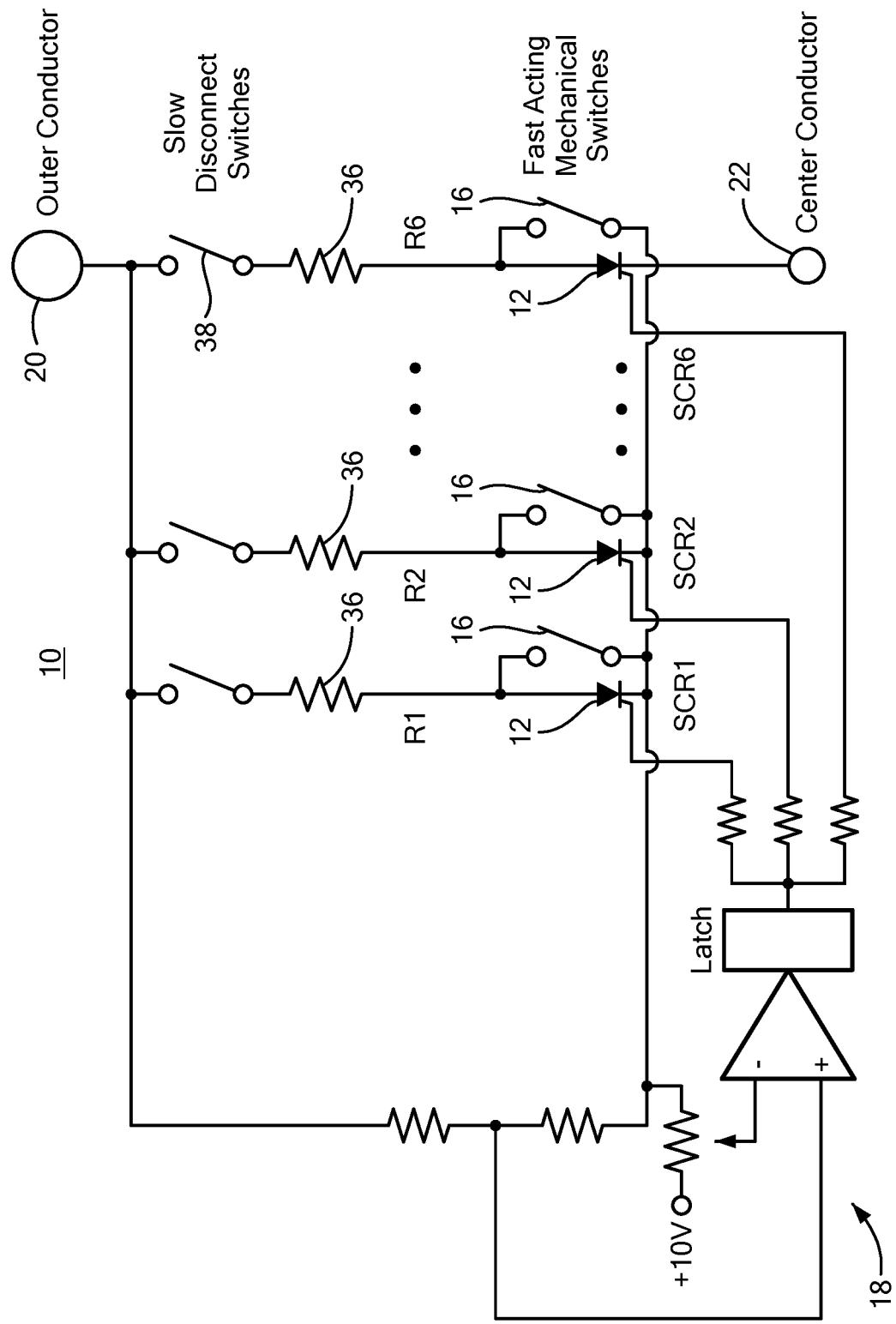
FIG. 6 is an electrical circuit diagram of the switch system shown in one or more of FIGS. 1-5D.

One example of switch system 10 including six SCRs 12 is shown electrically in FIG. 6, where like parts have been given like numbers.

Figure 7:
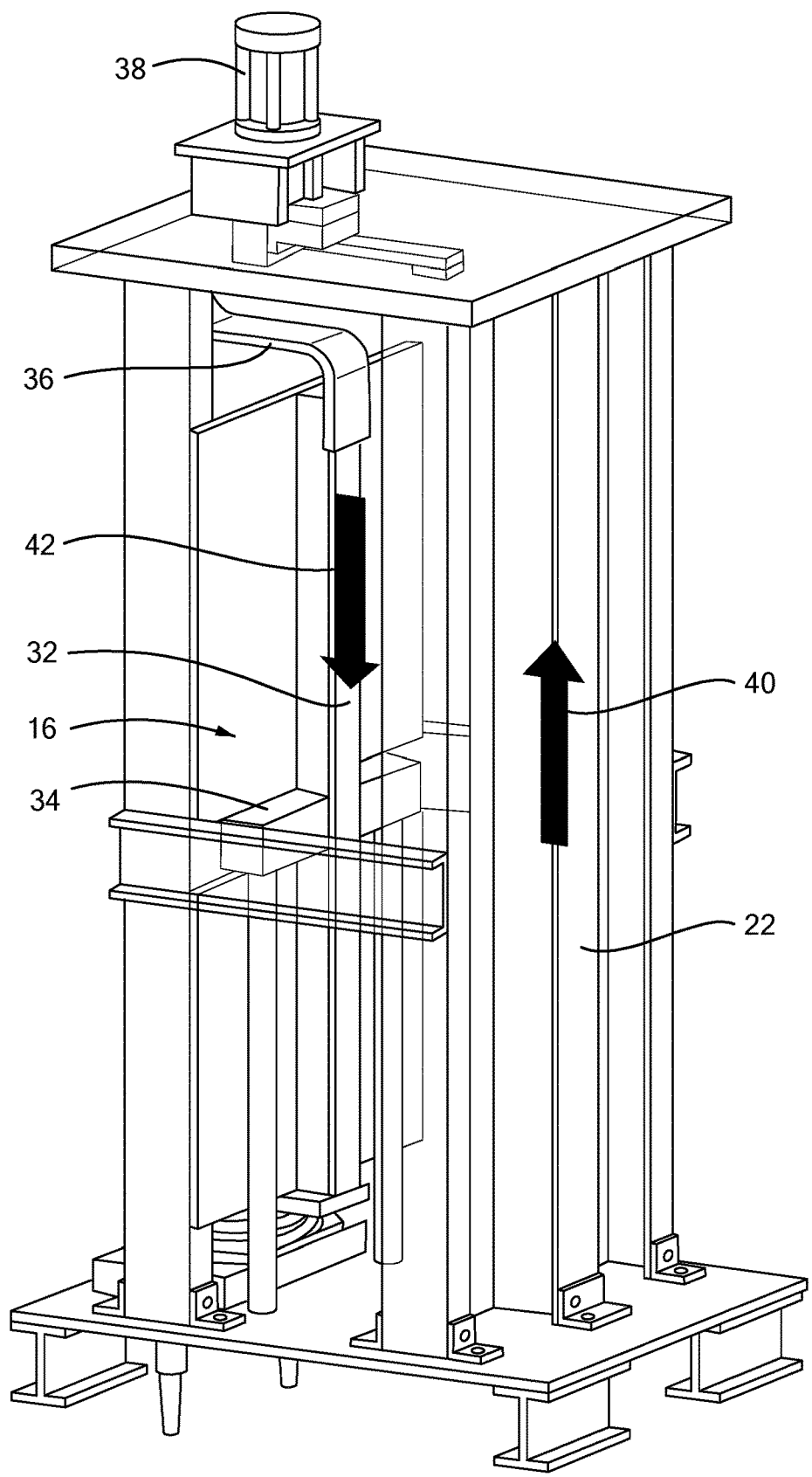
FIG. 7 is a three-dimensional view showing an example of a test prototype of the switch system shown in one or more of FIGS. 1-6.

FIG. 7, where like parts have been given like numbers, shows an example of test prototype of switch system 10 designed to test $1/6^{th}$ (one SCR 12) of switch system 10 including six SCRs 12.

The result is switch system 10 is preferably a passive, fast-acting, electrically isolated, high-current switch and vacuum feedthrough which effectively and efficiently prevents damage to high-current coil 14, a system that utilizes a high-current coil, or both. Switch system 10 preferably controls the current and magnetic field perturbation of high-current coil 14 which interacts with the magnetic fields within a device that confines plasma or systems utilizing superconducting coils, cryogenic coils, high-current coils used in various scientific or industrial applications, or similar type systems to prevent damage to the high-current coil, a system that utilizes a high-current coil, or both. Switch system 10 preferably prevents formation of relativistic electron beams capable of damaging the interior surfaces of a device that confines plasma. In this example, the required current is preferably generated by the same disruption-induced voltage, e.g., about 1 kV, or similar disruption-induced voltage, in high-current coil 14 loop. No external power supply may be required by switch system 10 and the activation is preferably completely passive. Current sharing dissipative resistor 36 discussed above preferably inertially (adiabatically) absorb the RE energy, preventing damage to the device that confines plasma.

The necessary current in high-current coil 14 depends upon the device. For example, the DIII-D (General Atomics, San Diego, CA) fusion machine requires up to about 200 kA in the REMC while SPARC (Commonwealth Fusion Systems, Cambridge, MA) requires up to about 500 kA in the REMC. Both fusion machines are currently defining the optimum REMC design to install.

Switch system 10 discussed above with reference to one or more of FIGS. 1-7 is preferably capable of operating at about 5 kV open circuit and conducting about 200 kA to about 500 kA for tens of milliseconds through a high strength vacuum feedthrough for use with a high-current coil 14. Depending on the number of switches and resistors, theoretically any voltage and current can be achieved.

In one example, switch system 10 preferably generates perturbative magnetic fields generated by currents in high-current coil 14 inside the device that confines plasma, e.g., tokamak vacuum vessel or similar device that confines plasma at either the vessel inner radius (DIII-D) or outer radius (SPARC), or a system or device that includes a super conducting coil, a cryogenic coil, a coil used for industrial or scientific purposes, or similar type system or device. The required current in high-current coil 14 is preferably generated by the same over-current event or disruption event discussed above. No external power supply is preferably required by switch system 10 and the activation is preferably completely passive, as discussed above. The induced current preferably requires only a few milliseconds to achieve its design value. The over-current event does the necessary transformer-coupled induction at exactly the right time. For example, for the DIII-D fusion device:

$$\Delta t = \frac{L \Delta I}{V} \approx 5 \text{ ms} \tag{2}$$

where $\Delta I \approx 200$ kA, $V \approx 400$ V, and $L \approx 10$ uH. However, in this example, when the plasma is not undergoing a disruption, high-current coil 14 must remain off. This can be guaranteed by having a switch system 10 turn ON only when a sufficiently large disruption loop voltage exists, as discussed above.

Switch system 10 may have more or less than six SCRs 12 each with their respective fast-acting mechanical switch 16, e.g., configurations which preferably maintain coaxial symmetry using 2, 3, or 4 paths to adjust effective resistance and current decay time. Additionally, as long as the coaxial symmetry is maintained, adding more SCRs 12, fast-actuating mechanical switches 16, and current sharing dissipative resistors 36 allows virtually any current and voltage to be conducted (SCR Peak Non-Repetitive Current*Number of SCRs=Maximum Current Capability). See Table 1 below.

One of the largest commercially available SCR 12, e.g., ABB #5STP 45Y8500, discussed above, may be rated for about 90 kA for about 10 ms (half-sine). In the example, each SCR 12 preferably has parameters and values shown in Table 1 below to provide sufficient voltage blocking capability. In one design, six such SCRs 12 of one example of switch system 10 preferably has a maximum current capability of about 540 kA.

TABLE 1

Typical conventional Large SCR ABB 5STP 45Y8500 SCR Parameters

| Parameter | Value |
|---|---|
| Max Repetitive Peak Forward and Reverse Blocking Voltage ($V_{DRM}$) | 8500 V |
| Peak Non-Repetitive ($I_{TSM}$) | 90 kA |
| RMS On-State Current ($I_{T(RMS)}$) | 6990 A |
| Threshold Voltage ($V_{T0}$) | 1.06 V |
| Overall OD | 192 mm |
| Contact OD | 143 mm |

In one example, each SCR 12 preferably has a large diameter, e.g., over about 7.5 inches, making the ring of six SCRs over about 24 inches in diameter. The selection of SCRs 12 is preferably based on applying derating for time, waveshape, turn on conditions and reliability.

As discussed in detail above, high electromotive forces are created by the repulsion between closely spaced parallel conductors with currents traveling in opposite directions, e.g., beam-bending conductor 32 and center conductor 22 as shown by equation (1) above. In one example, when $I_1$, the total current in center conductor 22, of equation (1) is equal to about 350 kA, $I_2$ equals about 350 kA/6, which equals 58.3 kA, in the individual SCR 12, and approximate C/d ratio equal 5, the repulsive force, indicated by arrow 44, FIGS. 5A and 5B is about 20.4 kN, which is equal to 2.5 tons. As discussed above, this large magnetic force slightly bends beam-bending conductor 32 to contact fast-acting mechanical switch 16 contact return 34 thereby closing the fast-acting mechanical switch 16.

When switch system 10 is used with SPARC, each SCR 12, e.g., six SCRs 12, preferably will carry a pulse of about 350 kA/6, or 58.3 kA current in parallel. After current begins to flow, each fast-acting mechanical switch 16 for each SCR 12 rapidly closes to shunt the current around each SCR 12. As discussed above, the large electromagnetic force, indicated by arrow 44, FIGS. 5A and 5B, is applied to beam-bending conductor 32 and causes beam-bending conductor 32 to bend slightly to contact fast-acting mechanical switch contact return 34 and enable, or close, fast-acting mechanical switch 16 to shunt current from each SCR 12 to prevent the buildup of energy in electrons that may lead to a destructive runaway electron event.

Switch system 10, shown in one or more of FIGS. 1-7, preferably includes current sharing dissipative resistor 36 in each of the current paths. In the example when switch system 10 includes six SCRs 12 and six fast-acting mechanical switches 16 there are six current paths and switch system 10 preferably includes a current sharing dissipative resistor 36 for each current path. In one example, current sharing dissipative resistor 36, also referred to herein as strap resistor 36, is preferably stainless steel or similar type strap resistor. Each current sharing dissipative resistor 36 is preferably designed to intentionally increase in resistance at the higher temperatures during a current pulse, which preferably reduces the pulse duration. Current sharing dissipative resistor 36 also preferably provides for equal current sharing among the SCR 12 paths.

Each current sharing dissipative resistor 36 or strap resistor 36 preferably provides the correct voltage and current and energy absorption capability to avoid overheating. Table 2 below shows one example of preliminary results for current sharing dissipative resistor 36 thermal calculations for absorbing the high-current coil 14 energy, e.g., minimal on the DIII-D, but almost to 2 MJ in the case of SPARC:

As discussed above, switch system 10 may include six parallel paths, e.g., for six SCRs 12 and six current sharing dissipative resistor 36. In other designs, switch system 10 may include different configurations while maintaining coaxial symmetry using 2, 3, or 4 paths to adjust effective resistance and hence, current decay time. Due to a positive temperature coefficient of resistivity, the resistance value of current sharing dissipative resistor 36 will increase during the pulse as it increases in temperature. Switch system 10 preferably utilizes this phenomenon for a tailored current pulse. A low peak temperature rise of 200° C. was assumed for these calculations. Even larger currents, time constants, and energies are possible with switch system 10.

The left side of Table 2 above shows example parameters for one example of switch system 10 shown in one or more of FIGS. 1-7 and the right side provides example parameters for the example of each of the six parallel current sharing dissipative resistors 36. In other designs, different current configurations of current sharing dissipative resistor 36 may be utilized by adjusting either disconnect switch 38 or the gate drives of each SCR 12.

Specifically, while maintaining coaxial current symmetry to limit non-radial forces, configurations of 2, 3, 4, 6, or more of current sharing dissipative resistor 36 are possible. In one example, it may be desirable to vary the current decay time by varying the L/R time by varying resistance, or as a graceful degradation feature, although unlikely, some paths could be out of service and the switch would still be usable.

High-current coil 14 shown in one or more of FIGS. 1-7 is preferably energized on an infrequent and intermittent basis for tens of milliseconds in response to a disruption event. Therefore, one key feature for solid-state switching devices, such as switch system 10, is the peak short-term current carrying capability. The plurality of SCRs 12 discussed above preferably have exceptional peak current capabilities. Each of plurality of SCRs 12 preferably have non-repetitive surge current ratings (e.g., half-sine, 10 milliseconds, or similar non-repetitive surge current ratings) of upwards of about 90 kA. The actual peak current that can be carried is a function of the "load integral" defined herein as the integral of the current-squared over the time of the surge, junction temperature, and the turn-off conditions (presence of reverse voltage at moment of turn-off). In one example, the operating conditions may be benign, e.g., no current in SCR 12 prior to the surge, so junction temperature is low, and no significant reverse voltage at moment of turn-off.

Each SCR 12 is preferably only a closing switch. Once triggered, each SCR 12 remains in an ON state until its current falls to nearly zero. In one example, this behavior may be a benefit as it preferably ensures each SCR 12 will remain ON for the duration of the disruption.

TABLE 2

Typical stainless steel resistor thermal calculations for absorbing the high-current coil energy.

| | System Parameters | | | | | Each Resistor of six | | | | |
|---|---|---|---|---|---|---|---|---|---|---|
| Tokamak | Current (kA) | L/R (ms) | REMC Inductance (µH) | Inductive Energy (kJ) | Req (mΩ) | Rpath (mΩ) | Len (cm) | Ht (cm) | Wid (cm) | Mass (g) |
| DIII-D | 20 | 10 | 10 | 2 | 1 | 6.00 | 6 | 0.015 | 5.0 | 3.3 |
| DIII-D | 200 | 100 | 10 | 200 | 0.1 | 0.60 | 9 | 0.92 | 5.0 | 333 |
| SPARC | 500 | 10 | 15 | 1875 | 1.5 | 9.00 | 211 | 0.37 | 5.0 | 3125 |
| SPARC | 500 | 100 | 15 | 1875 | 0.15 | 0.90 | 67 | 1.17 | 5.0 | 3125 |

In one design, switch system 10, shown in one or more of FIGS. 1-7, may be designed as a 500 kA, 1 kV switch and vacuum feedthrough for high-current coil 14 and preferably uses an axisymmetric design to minimize electromagnetic forces. Switching is preferably accomplished passively and each SCR 12 switch is preferably simultaneously activated. Fast-acting mechanical switch contact returns 34 preferably contact a fast-acting mechanical switch 16 coupled to stiff lower base plate 28 to unload SCR 12 currents thereby permitting high current, long duration pulses. Low-inductance current sharing dissipative resistor 36 adiabatically dissipates the energy of high-current coil 14. Current sharing dissipative resistors 36 are preferably designed to dynamically increase resistance as temperature increases to reduce pulse duration. Disconnect switches may be provided for maintenance or other purposes.

In one example, switch system 10 may be a 2 kV, 200 kA switch system capable of conducting current for 10 to 100 milliseconds, e.g., for use with the DIII-D discussed above, or similar type device.

Figure 8:
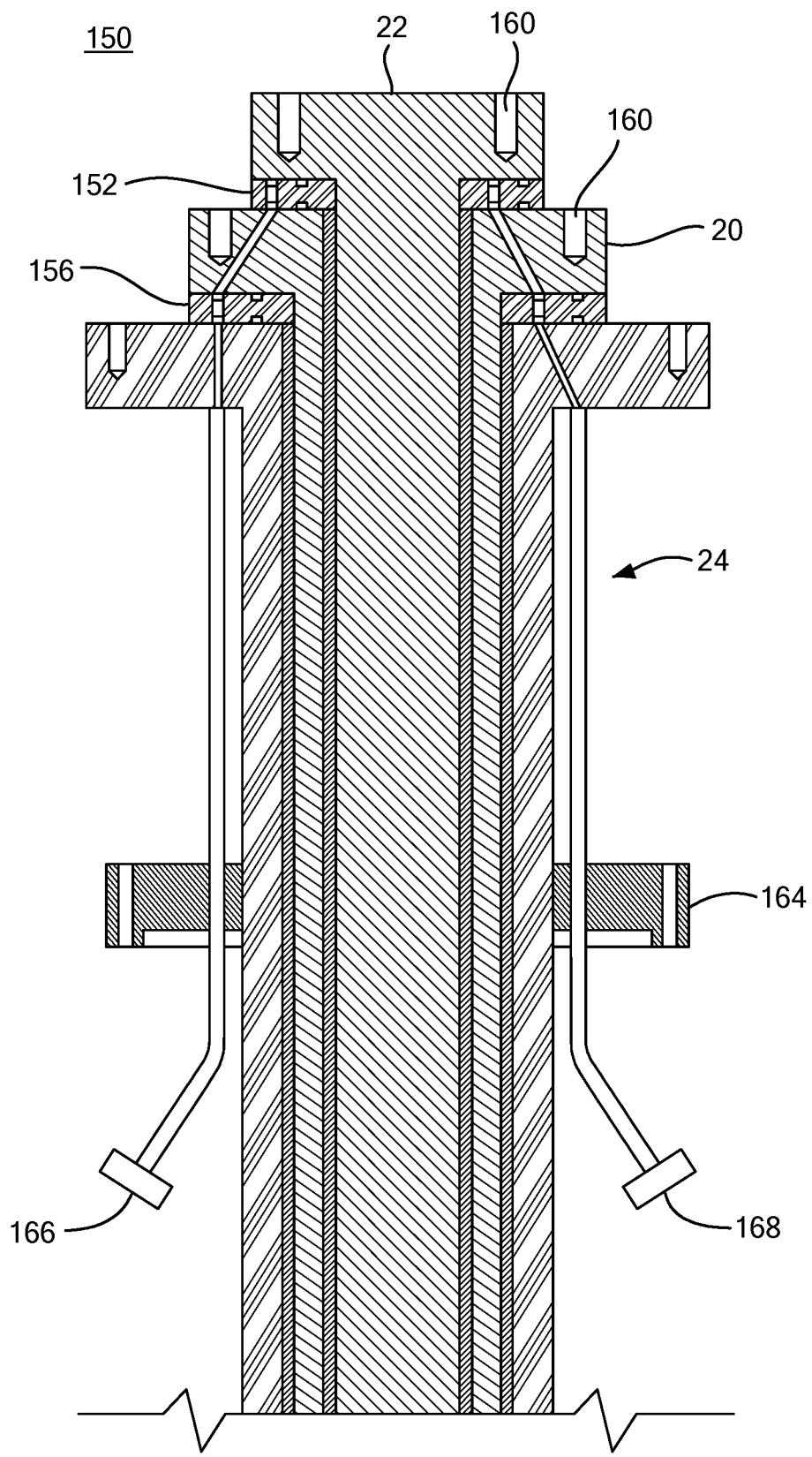
FIG. 8 is a schematic diagram showing one example of a vacuum feedthrough subsystem utilized with the switch system shown in one or more of FIGS. 1-7.

In one design, switch system 10 preferably includes vacuum feedthrough subsystem 150, FIG. 8 which may be utilized to couple switch system 10 shown in one or more of FIGS. 1-7 to a vacuum chamber of a device that confines plasma or a system or device that includes a super conducting coil, a cryogenic coil, a coil used for industrial or scientific purposes, or similar type system or device. Vacuum feedthrough subsystem 150 is preferably a low-inductance, high-strength, high power vacuum feedthrough subsystem. In one example, vacuum feedthrough subsystem 150 is preferably constructed by studying the shock and energetic forces due to high magnetic field and investigating the effects of neutron dose on state-of-the-art insulating materials. The design of coaxial feedthrough 24, also shown in FIG. 1-4, is preferably chosen to minimize side forces as the vacuum feedthrough subsystem 150 enters the toroidal field of a device that confines plasma. Coaxial feedthrough 24, FIGS. 1-4, and 8 is preferably designed to distribute the high forces evenly.

The environment for some devices that confine plasma, such as the DIII-D tokamak discussed above, is not a high radiation environment. However, other devices that confine plasma, such as SPARC tokamak and its follow-on ARC (affordable, robust, compact) tokamak have a high radiation environment.

Vacuum feedthrough subsystem 150 preferably include at least one sliding ceramic seal, e.g., sliding ceramic seal 152 which preferably maintains a high vacuum in a high vacuum chamber when power is conducted through vacuum feedthrough subsystem 150 by coaxial feedthrough 24, e.g., when a disruption event occurs, to prevent high shock and high forces, e.g., the resulting current from a disruption event, from damaging vacuum feedthrough subsystem 150.

Vacuum feedthrough subsystem 150 may also include sliding ceramic seal 156 which preferably maintains a low vacuum in a low vacuum chamber. Sliding ceramic seal 152 and/or sliding ceramic seal 156 preferably maintains good contact with the vacuum chamber, is preferably durable, preferably does not wear out easily, and preferably withstands radiation.

Vacuum feedthrough subsystem 150 also preferably includes bus connectors 160, high vacuum conflat 164, outer high vacuum Wilson seal port 166, and inner low vacuum Wilson seal port 168.

Vacuum feedthrough subsystem 150 with sliding ceramic seal 152 and/or sliding ceramic seal 156 may be utilized with the DIII-D tokamak. Vacuum feedthrough subsystem 150 and may be utilized when switch system 10 is configured for 500 kA in a high radiation environment, e.g., the SPARC tokamak, its follow-on ARC, or similar devices that confine plasma. Vacuum feedthrough subsystem 150 preferably retains vacuum integrity and low gas blowby while allowing for small displacements due to the large magnetic force on the high-current coils and feedthrough connections.

Figure 9:
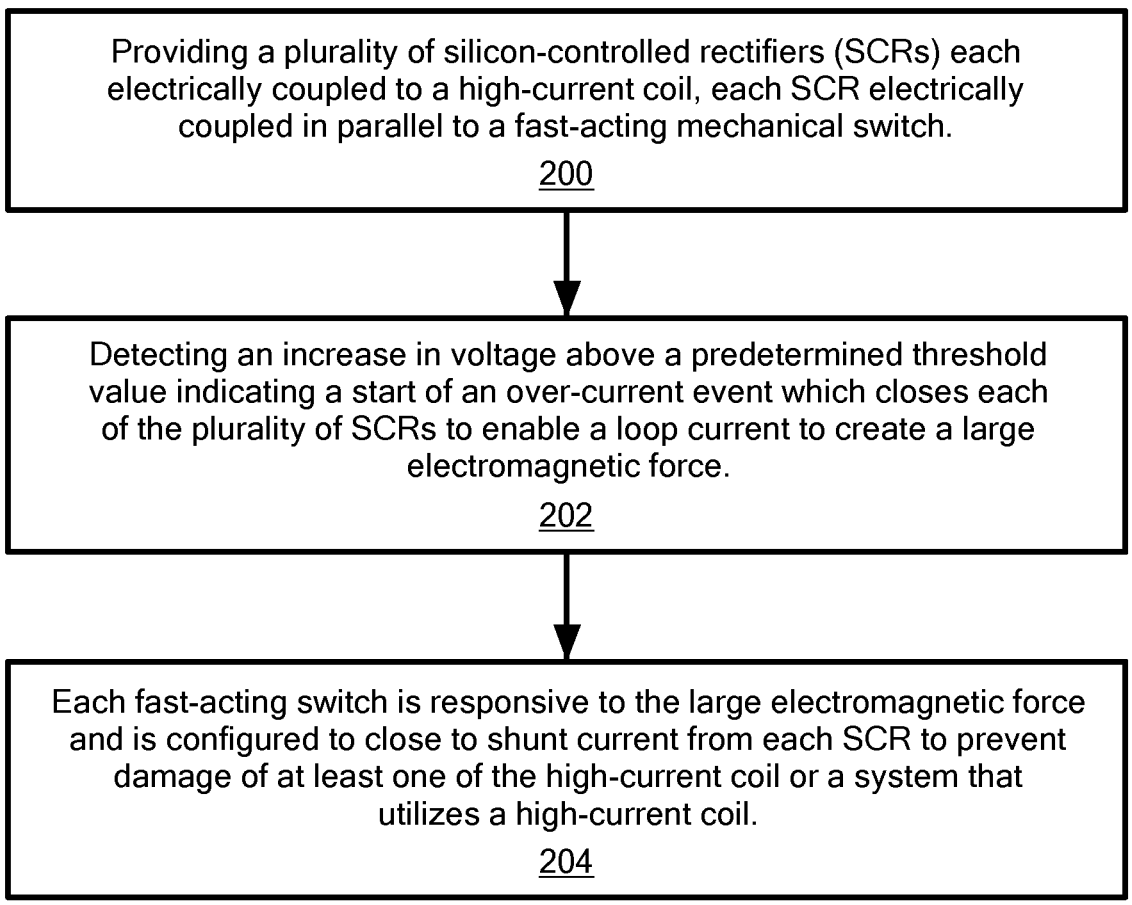
FIG. 9 is a block diagram showing the primary steps of one example of the passively activated switch method for a high-current coil.

One example of the method for a passively activated switch system for a high-current coil includes providing a plurality of silicon-controlled rectifiers (SCRs) each electrically coupled to a high-current coil, each SCR electrically coupled in parallel to a fast-acting mechanical switch, step 200, FIG. 9, detecting an increase in voltage above a predetermined threshold value indicating a start of an over-current event which closes each of the plurality of SCRs to enable a loop current to create a large electromagnetic force, step 202. Each fast-acting switch is responsive to the large electromagnetic force and is configured to close to shunt current from each SCR to prevent damage of at least one of the high-current coils or a system that utilizes a high-current coil, step 204.

Although specific features of the invention are shown in some drawings and not in others, this is for convenience only as each feature may be combined with any or all of the other features in accordance with the invention. The words "including", "comprising", "having", and "with" as used herein are to be interpreted broadly and comprehensively and are not limited to any physical interconnection. Moreover, any embodiments disclosed in the subject application are not to be taken as the only possible embodiments. Other embodiments will occur to those skilled in the art.

In addition, any amendment presented during the prosecution of the patent application for this patent is not a disclaimer of any claim element presented in the application as filed: those skilled in the art cannot reasonably be expected to draft a claim that would literally encompass all possible equivalents, many equivalents will be unforeseeable at the time of the amendment and are beyond a fair interpretation of what is to be surrendered (if anything), the rationale underlying the amendment may bear no more than a tangential relation to many equivalents, and/or there are many other reasons the applicant cannot be expected to describe certain insubstantial substitutes for any claim element amended.

Other embodiments will occur to those skilled in the art and are within the following claims.

What is claimed is:

1. A passively activated switch system for a high-current coil, the system comprising:
    a plurality of silicon-controlled rectifiers (SCRs) each electrically coupled to a high-current coil, each SCR electrically coupled in parallel to a fast-acting mechanical switch;
    a passive voltage detector responsive to an increase in voltage above a predetermined threshold value indicating a start of an over-current event which closes each of the plurality of SCRs to enable a loop current to create a large electromagnetic force; and
    each fast-acting switch responsive to the large electromagnetic force and configured to close to shunt current from each SCR to prevent damage of at least one of the high-current coils or a system that utilizes a high-current coil.

2. The system of claim 1 in which the high-current coil includes at least one of: a non-axisymmetric runaway electron mitigation coil (REMC), a super conducting coil, a cryogenic coil, or a coil used for industrial or scientific purposes.

3. The system of claim 1 in which the over-current event includes a start of a plasma disruption event.

4. The system of claim 1 in which each fast-acting switch is electromagnetically-actuated.

5. The system of claim 1 in which each fast-acting switch is configured to protect each SCR from overheating at high action integrals.

6. The system of claim 1 including an outer conductor coupled to the high-current coil, a center conductor coupled to the high-current coil, an upper base plate, and a lower base plate.

7. The system of claim 6 including a conductive semi-flexible strap coupled to the lower base plate, a beam-bending conductor coupled to the semi-flexible strap, a fast-acting mechanical switch contact return, a current-sharing dissipative resistor, and a disconnect switch, each coupled to one of the plurality of SCRs.

8. The system of claim 7 in which the electromagnetic force between the center conductor and the beam-bending conductor causes the beam-bending conductor to contact the fast mechanical switch contact return to enable the fast-acting mechanical switch to shunt current from the SCR.

9. The system of claim 7 in which each current-sharing dissipative resistor is configured to equalize the loop current to ensure the electromagnetic force is about equal in each fast-acting mechanical switch such that each fast-acting mechanical switch closes at about the same time.

10. The system of claim 7 in which each current-sharing dissipative resistor is configured to equalize the loop current to ensure the electromagnetic force is about equal in each fast-acting mechanical switch and each SCR to prevent damage to one or more of the plurality of SCRs.

11. The system of claim 1 in which each SCR is configured to provide a fast rise time to rapidly shunt the loop current to each fast-acting switch thereby enabling each fast-acting switch to provide a higher action integral than each SCR independently.

12. The system of claim 1 in which a required number of SCRs which conduct a predetermined input current is determined by dividing the predetermined input current by a maximum current capacity of each SCR.

13. The system of claim 1 in which the system is configured to accommodate different predetermined input currents and the number of SCRs required is determined by each different predetermined input current.

14. The system of claim 1 in which no external power is required.

15. The system of claim 1 including a vacuum feedthrough subsystem including at least one sliding ceramic seal configured to maintain a high vacuum in a high vacuum chamber when power is conducted through the vacuum feedthrough subsystem to prevent high shock and high forces from damaging the vacuum feedthrough subsystem.

16. A method for a passively activated switch system for a high-current coil, the method comprising:
providing a plurality of silicon-controlled rectifiers (SCRs) each electrically coupled to a high-current coil, each SCR electrically coupled in parallel to a fast-acting mechanical switch;
detecting an increase in voltage above a predetermined threshold value indicating a start of an over-current event which closes each of the plurality of SCRs to enable a loop current to create a large electromagnetic force; and
each fast-acting switch responsive to the large electromagnetic force and configured to close to shunt current from each SCR to prevent damage of at least one of the high-current coils or a system that utilizes a high-current coil.

17. The method of claim 16 in which the high-current coil includes at least one of: a non-axisymmetric runaway electron mitigation coil (REMC), a super conducting coil, a cryogenic coil, or a coil used for industrial or scientific purposes.

18. The method of claim 16 in which the over-current event includes a start of a plasma disruption event.

19. The method of claim 16 including electromagnetically actuating each fast-acting switch.

20. The method of claim 16 in which each fast-acting switch is configured to protect each SCR from overheating at high action integrals.

21. The method of claim 16 including providing an outer conductor coupled to the high-current coil, a center conductor coupled to the high-current coil, an upper base plate, and a lower base plate.

22. The method of claim 21 including providing a conductive semi-flexible strap coupled to the lower base plate, a beam-bending conductor coupled to the semi-flexible strap, a fast-acting mechanical switch contact return, a current-sharing dissipative resistor, and a disconnect switch, each coupled to one of the plurality of SCRs.

23. The method of claim 22 in which the electromagnetic force between the center conductor and the beam-bending conductor causes the beam-bending conductor to contact the fast mechanical switch contact return to enable the fast-acting mechanical switch to shunt current from the SCR.

24. The method of claim 22 in which each current-sharing dissipative resistor is configured to equalize the loop current to ensure the electromagnetic force is about equal in each fast-acting mechanical switch such that each fast-acting mechanical switch closes at about the same time.

25. The method of claim 22 in which each current-sharing dissipative resistor is configured to equalize the loop current to ensure the electromagnetic force is about equal in each fast-acting mechanical switch and each SCR to prevent damage to one or more of the plurality of SCRs.

26. The method of claim 16 in which each SCR is configured to provide a fast rise time to rapidly shunt the loop current to each fast-acting switch thereby enabling each fast-acting switch to provide a higher action integral than each SCR independently.

27. The method of claim 16 in which a required number of SCRs which conduct a predetermined input current is determined by dividing the predetermined input current by a maximum current capacity of each SCR.

28. The method of claim 16 in which the system is configured to accommodate different predetermined input currents and the number of SCRs required is determined by each different predetermined input current.

29. The method of claim 16 in which no external power is required.

30. The method of claim 16 including providing a vacuum feedthrough subsystem including at least one sliding ceramic seal configured to maintain a high vacuum in a high vacuum chamber when power is conducted through the vacuum feedthrough subsystem to prevent high shock and high forces from damaging the vacuum feedthrough subsystem.

* * * * *